United States Patent
Holler et al.

(10) Patent No.: US 9,529,642 B2
(45) Date of Patent: Dec. 27, 2016

(54) POWER BUDGET ALLOCATION IN A CLUSTER INFRASTRUCTURE

(71) Applicant: VMware, Inc., Palo Alto, CA (US)

(72) Inventors: Anne Holler, Los Altos, CA (US);
Yong Fu, St. Louis, MO (US);
Kinshuk Govil, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 216 days.

(21) Appl. No.: 14/194,599

(22) Filed: Feb. 28, 2014

(65) Prior Publication Data

US 2014/0298047 A1 Oct. 2, 2014

Related U.S. Application Data (60) Provisional application No. 61/806,209, filed on Mar. 28, 2013.

(51) Int. Cl.
| | | |
|---|---|---|
| *G06F 1/00* | (2006.01) | |
| *G06F 1/32* | (2006.01) | |
| *G06F 9/50* | (2006.01) | |
| *G06F 1/26* | (2006.01) | |

(52) U.S. Cl.
CPC .............. *G06F 9/5094* (2013.01); *G06F 1/26* (2013.01); *G06F 1/3206* (2013.01); *G06F 1/329* (2013.01); *Y02B 60/142* (2013.01); *Y02B 60/144* (2013.01); *Y02B 60/32* (2013.01)

(58) Field of Classification Search
CPC ...................................................... G06F 1/3203
USPC ......................................................... 713/300
See application file for complete search history.

(56) References Cited

U.S. PATENT DOCUMENTS

| | | | | |
|---|---|---|---|---|
| 7,979,729 | B2 * | 7/2011 | Bletsch et al. ................ | 713/340 |
| 8,301,742 | B2 * | 10/2012 | Hanson et al. ................ | 709/223 |
| 8,601,287 | B1 * | 12/2013 | Weber et al. ................. | 713/300 |
| 8,904,209 | B2 * | 12/2014 | Davis et al. .................. | 713/320 |
| 8,972,702 | B2 * | 3/2015 | Banerjee et al. ............. | 712/220 |
| 2015/0067356 | A1 * | 3/2015 | Trichy Ravi et al. ........ | 713/300 |

OTHER PUBLICATIONS

Resource Management with VMware DRS, http://vmware.com/pdf/vmware drs wp.pdf; 2006.
VMware Distributed Power Management Concepts and Use, http://www.vmware.com/resources/techresources/1080; 2010.
O. A. Ben-Yehuda et al.; "The Resource-as-a-Service (RaaS) cloud"; In USENIX HotCloud'12, Jun. 2012.
Daniel Bounds, John Jenne and Robert Hormuth; "Optimizing the Data Center: New Dell Servers and the Dell Energy Smart Architecture," Dell Power Solutions, Jun. 2009, pp. 22-26.
A. Dorofeev, A. Holler, T. Mann, and G. Shanmuganthan. "ptDRS: Respecting Host Power and Temperature Limits in a DRS cluster"; In VRADIO, 2011.

(Continued)

*Primary Examiner* — Suresh Suryawanshi (57) ABSTRACT

A system and method for allocating power resources among host computers in a cluster uses lower and upper bounds with respect to a power budget to be distributed to each of the hosts. Each host is allocated a portion of the cluster power capacity. Any excess amount of the capacity is then allocated to the hosts based at least partly on the lower bound (reserve capacity) and the upper bound (host power limit) of each of the clients.

27 Claims, 7 Drawing Sheets

(56) References Cited

OTHER PUBLICATIONS

X. Fan, W.-D. Weber, and L. A. Barroso. "Power Provisioning for a Warehouse-sized Computer"; In Proceedings of the ACM Symposium on Computer Architecture, San Diego, CA, Jun. 2007.

A. Gulati, A. Holler, M. Ji, G. Shanmuganathan, C. Waldspurger, and X. Zhu. "Vmware Distributed Resource Management: Design, Implementation, and Lessons Learned"; http://labs. vmware.com/publications/vmware-technical-journal; Mar. 2012.

A. Gulati, G. Shanmuganathan, A. Holler, and I. Ahmad; Cloud-Scale Resource Management: Challenges and Techniques; in HotCloud, 2011.

Hewlett-Packard; "HP Dynamic Power Capping"; http://h18004.www1.hp.com/products/servers/management/dynamic-power-capping/faq.html; 2012.

IBM; IBM Active Energy Manager; http://pic.dhe.ibm.com/infocenter/director/v5r2/index.jsp?topic=/aem_310/frb0_t_power_cap.html; 2012.

H. Lim, A. Kansal, and J. Liu; "Power Budgeting for Virtualized Data Centers"; In 2011 USENIX Annual Technical Conference (USENIX ATC'11), 2011.

R. Nathuji, P. England, P. Sharma, and A. Singh; "Feedback Driven QoS-Aware Power Budgeting for Virtualized Servers"; In Fourth International Workshop on Feedback Control Implementation and Design in Computing Systems and Networks (FeBID), 2009.

S. Pelley, D. Meisner, P. Zandevakili, T. F. Wenisch, and J. Underwood; "Power Routing: Dynamic Power Provisioning in the Data Center"; SIGPLAN Not., 45(3):231-242, Mar. 2010.

R. Raghavendra, P. Ranganathan, V. Talwar, Z. Wang, and X. Zhu; "No "Power" Struggles: Coordinated Multi-level Power Management for the Data Center"; In ACM SIGARCH Computer Architecture News, vol. 36, pp. 48-59. ACM, 2008.

Gartner Research; "Shrinking Data Centers: Your Next Data Center Will Be Smaller Than You Think"; http://www.m4m.net/library/shrinking_data_centers.pdf; Mar. 2011.

X. Wang and Y. Wang; "Coordinating Power Control and Performance Management for Virtualized Server Clusters"; IEEE Transactions on Parallel and Distributed Systems, 22(2):245-259, Feb. 2011.

* cited by examiner

POWER BUDGET ALLOCATION IN A CLUSTER INFRASTRUCTURE

CROSS REFERENCE TO RELATED APPLICATION

This application is entitled to the benefit of U.S. Provisional Patent Application Ser. No. 61/806,209, filed on Mar. 28, 2013, which is incorporated herein by reference.

BACKGROUND

Sharing resources in networked computers, such as processors, computer memories, network bandwidth and data storage facilities, can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtual machines (VMs) for virtualized environments.

A set of hardware computing platforms can be organized as a server cluster to provide computing resources for resource sharing. These server clusters can be organized in a data center. In addition, supporting technology (i.e., virtualization machine manager) can move running VMs between servers in the cluster. Additionally, the virtual machine manager (VMM) can determine initial and ongoing locations of virtual machines on hardware computing platforms in the server cluster, and can manage the allocation of cluster computing resources in accordance with constraints and objectives. In addition, the server cluster virtualization management software can request that a server in the cluster power itself down, and can use mechanisms to remotely power-on a server that is powered down. Server clusters consume significant power. The cost of that power is a major expense in operating a server cluster, and generating that power can have an environmental impact.

SUMMARY

A system and method for allocating power resources among host computers in a cluster uses lower and upper bounds with respect to a power budget to be distributed to each of the hosts. Each host is allocated a portion of the cluster power capacity. Any excess amount of the capacity is then allocated to the hosts based at least partly on the lower bound and the upper bound of each of the clients.

A method for allocating power budgets among the host computers in a cluster in accordance with an embodiment of the invention comprises receiving a power limit of a cluster of host computers, calculating a total power usage of the cluster, determining a spare power capacity based on the power budget of the cluster and the total power usage of the host computers, and allocating a portion of the spare power capacity to at least one of the host computers based at least partly on the spare power capacity. In some embodiments, the steps of this method are performed when program instructions contained in a computer-readable storage medium is executed by one or more processors.

A distributed computer system in accordance with an embodiment of the invention comprises a plurality of clusters of host computers and at least one resource management module operably connected to the plurality of clusters. Each of the host computers includes a processor, memory, and a network interface, the host computer being configured to support a plurality of clients. The at least one resource management module is configured to: receive a power limit of a cluster, calculate a total power usage of the host computers, determine a spare power capacity based on the power budget of the cluster and the total power usage of the host computers, and allocate a portion of the spare power capacity to at least one of the plurality of host computing machines based at least partly on the spare power capacity Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
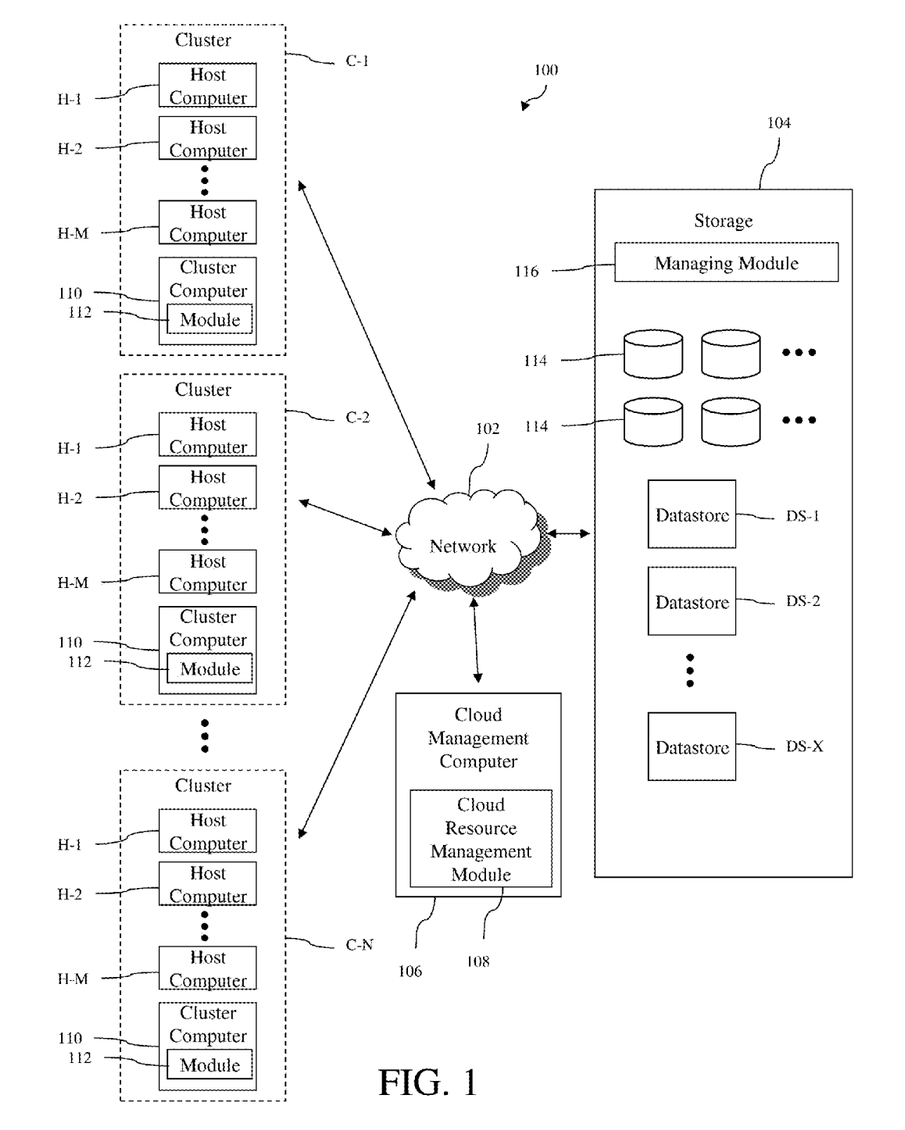
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system 100 includes a network 102, clusters C-1, C-2 . . . C-N (where N is a positive integer) of host computers, storage 104 and a cloud management computer 106 with a cloud resource management module 108. The exact number of host computer clusters C-1, C-2 . . . C-N included in the distributed computer system can be any number of clusters from a few clusters to tens of clusters or more. The host computers of the different clusters, the storage 104 and the management computer 106 are connected to the network 102. Thus, each of the host computers in the clusters and the management computer 106 are able to access the storage 104 via the network 102 and may share the resources provided by the storage 104. Consequently, any process running on any of the host computers and the management computer 106 may also access the storage 104 via the network 102.

In the illustrated embodiment, each of the clusters C-1, C-2 . . . C-N includes a number of host computers H-1, H-2 . . . H-M (where M is a positive integer) and a cluster management computer 110 with a cluster resource management module 112. The number of host computers H-1, H-2 . . . H-M included in each of the clusters can be any number from one to several hundred or more. In addition, the number of host computers H-1, H-2 . . . H-M included in each of the clusters C-1, C-2 . . . C-N can vary so that different clusters can have different number of host computers. The host computers H-1, H-2 . . . H-M are physical computer systems that host or support one or more clients so that the clients are executing on the physical computer systems. As used herein, the term "client" is any software entity that can run on a computer system, such as a software application, a software process, or a virtual machine (VM). The host computers H-1, H-2 . . . H-M may be servers that are commonly found in data centers. As an example, the host computers H-1, H-2 . . . H-M may be servers installed in one or more server racks. In one embodiment, the host computers H-1, H-2 . . . H-M are located within the same server rack.

Figure 2:
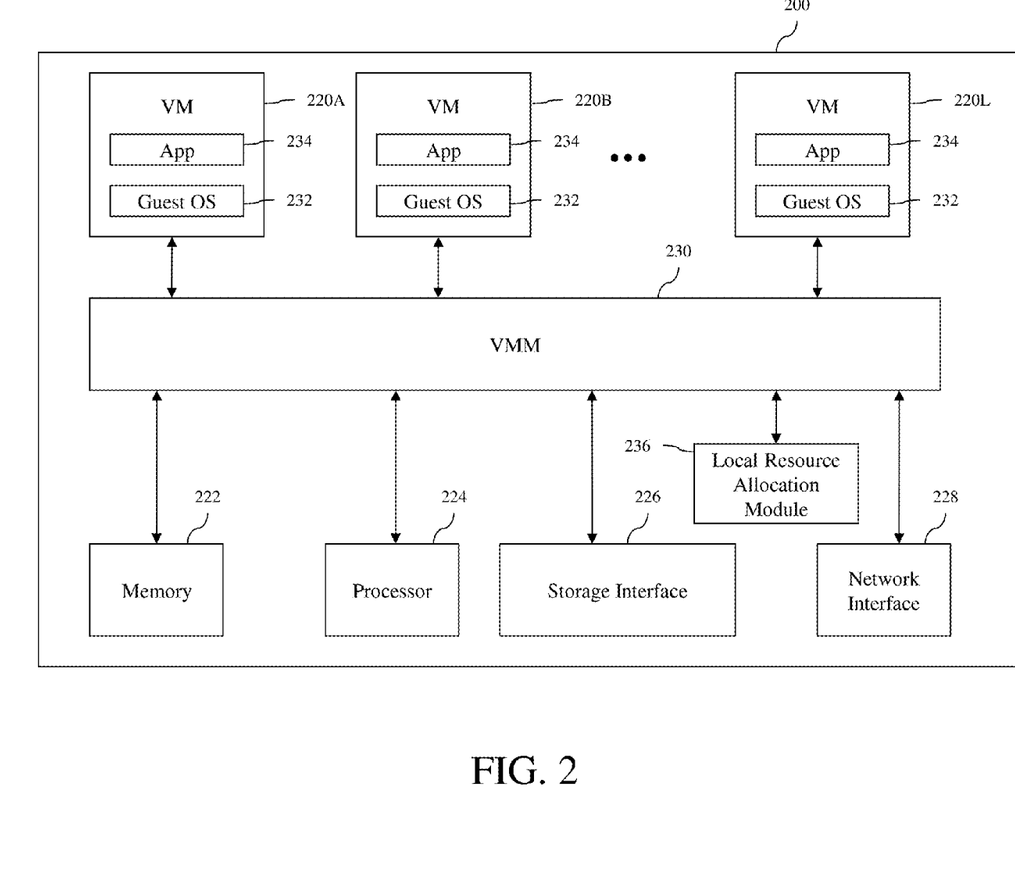
FIG. 2 is a block diagram of a host computer of the distributed computer system of FIG. 1 in accordance with an embodiment of the invention.

Turning now to FIG. 2, components of the host computer (hereinafter "host") 200 that is representative of the host computers H-1, H-2 . . . H-M in the clusters C-1, C-2 . . . C-N in accordance with an embodiment of the invention are shown. In FIG. 2, the physical connections between the various components of the host 200 are not illustrated. In the illustrated embodiment, the host 200 is configured to support a number of clients 220A, 220B . . . 220L (where L is a positive integer), which are VMs. The number of VMs supported by the host 200 can be anywhere from one to more than one hundred. The exact number of VMs supported by the host 200 is only limited by the physical resources of the host 200. The VMs share at least some of the hardware resources of the host 200, which include system memory 222, one or more processors 224, a storage interface 226, and a network interface 228. The system memory 222, which may be random access memory (RAM), is the primary memory of the host 200. The processor 224 can be any type of a processor, such as a central processing unit (CPU) commonly found in a server. The storage interface 226 is an interface that allows that the host 200 to communicate with the storage 104. As an example, the storage interface 226 may be a host bus adapter or a network file system interface. The network interface 228 is an interface that allows the host 200 to communicate with other devices connected to the network 102. As an example, the network interface 228 may be a network adapter.

In the illustrated embodiment, the VMs 220A, 220B . . . 220L run on top of a virtual machine monitor (VMM) 230, which is a software interface layer that enables sharing of the hardware resources of the host 200 by the VMs 220A, 220B . . . 220L. However, in other embodiments, one or more of the VMs 220A, 220B . . . 220L can be nested, i.e., a VM running in another VM. For example, one of the VMs 220A, 220B . . . 220L may be running in a VM, which is also running in another VM. The virtual machine monitor 230 may run on top of the host's operating system or directly on hardware of the host. In some embodiments, the virtual machine monitor 230 runs on top of a hypervisor that is installed on top of the hardware components of the host 200. With the support of the virtual machine monitor 230, the VMs 220A, 220B . . . 220L provide virtualized computer systems that give the appearance of being distinct from the host 200 and from each other. Each VM includes a guest operating system 232 and one or more guest applications 234. The guest operating system 232 is a master control program of the respective VM and, among other things, the guest operating system 232 forms a software platform on top of which the guest applications 234 run.

Similar to any other computer system connected to the network 102, the VMs 220A, 220B . . . 220L are able to communicate with other computer systems connected to the network using the network interface 228 of the host 200. In addition, the VMs 220A, 220B . . . 220L are able to access the storage 104 using the storage interface 226 of the host 200.

The host 200 also includes a local resource allocation module 236 that operates as part of a resource allocation system to manage and allocate resources consumed by the VMs 220A, 220B . . . 220L using resource allocation parameters, which are described in more detail below. Although the local resource allocation module 236 is illustrated in FIG. 2 as being separate from the virtual machine monitor 230, the local resource allocation module 236 may be implemented as part of the virtual machine monitor 230. In some embodiments, the local resource allocation module 236 is implemented as software program running on the host 200. However, in other embodiments, the local resource allocation module 236 may be implemented using any combination of software and hardware.

Turning back to FIG. 1, each of the cluster management computers 110 in the clusters C-1, C-2 . . . C-N operates to monitor and manage the host computers H-1, H-2 . . . H-M in the respective cluster. Each cluster management computer 110 may be configured to monitor the current configurations of the host computers H-1, H-2 . . . H-M and the clients running on the host computers H-1, H-2 . . . H-M, for example, virtual machines (VMs), in the respective cluster. The monitored configurations may include hardware configuration of each of the host computers H-1, H-2 . . . H-M, such as CPU type and memory size, and/or software configurations of each of the host computers H-1, H-2 . . . H-M, such as operating system (OS) type and installed applications or software programs. The monitored configurations may also include client hosting information, i.e., which clients, e.g., VMs, are hosted or running on which host computers H-1, H-2 . . . H-M. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. In an implementation, for each client, the limit, reservation and share values for one or more consumable resources are user-defined or predefined as default values. The demand values of the clients for the consumable resources are determined by the host computers H-1, H-2 . . . H-M hosting the clients by monitoring the current usage of resources by the clients, e.g., CPU processing usage, memory usage, network usage and/or storage usage, and provided to the respective cluster management computers 110.

The cluster management computers 110 may also perform various operations to manage the clients and the host computers H-1, H-2 . . . H-M in their respective clusters C-1, C-2 . . . C-N. As an example, the cluster management computers 110 may be configured to initially place new clients onto one or more of the host computers H-1, H-2 . . . H-M in their respective clusters and move existing clients to different host computers and/or different clusters. As another example, the cluster management computers 110 may be configured to power down particular clients and/or host computers H-1, H-2 . . . H-M in their respective clusters to conserve power. The cluster management computers 110 may be configured or programmed to perform other operations to manage their respective clusters. In some embodiments, the cluster management computers 110 may be physical computers. In other embodiments, each of the cluster management computers 110 may be implemented as software program running on a physical computer or a VM. In an implementation, the cluster management computers 110 are VMware vCenter™ servers with at least some of the features available for such servers.

The cluster resource management module 112 in each of the cluster management computers 110 operates to implement a resource allocation technique, as described in more detail below. In the illustrated embodiment, the cluster resource management modules 112 of the cluster management computers 110 and the cloud resource management module 108 work together to implement the resource allocation technique. In some embodiments, the cluster resource management module 112 is implemented as software program running on the supporting computer. However, in other embodiments, the cluster resource management module 112 may be implemented using any combination of software and hardware.

The network 102 can be any type of computer network or a combination of networks that allows communications between devices connected to the network 102. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the clusters C-1, C-2 . . . C-N, which can be accessed like any other storage device connected to computer systems. In an embodiment, the storage can be accessed by entities, such as clients running on the host computers H-1, H-2 . . . H-M, using any file system, e.g., virtual machine file system (VMFS) or network file system (NFS). The storage 104 includes one or more computer data storage devices 114, which can be any type of storage devices, such as solid-state devices (SSDs), hard disks or a combination of the two. The storage devices 114 may operate as components of a network-attached storage (NAS) and/or a storage area network (SAN). The storage 104 includes a storage managing module 116, which manages the operation of the storage 104. In an embodiment, the storage managing module 116 is a computer program executing on one or more computer systems (not shown) of the storage 104. The storage 104 supports multiple datastores DS-1, DS-2 . . . DS-X (where X is a positive integer), which may be identified using logical unit numbers (LUNs). In an embodiment, the datastores DS-1, DS-2 . . . DS-X are virtualized representations of storage facilities. Thus, each datastore DS-1, DS-2 . . . DS-X may use the storage resource from more than one storage device 114 included in the storage 104. The datastores DS-1, DS-2 . . . DS-X are used to store data associated with the clients supported by the host computers H-1, H-2 . . . H-M of the clusters C-1, C-2 . . . C-N. For virtual machines, the datastores DS-1, DS-2 . . . DS-X may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores DS-1, DS-2 . . . DS-X may be grouped into one or more clusters of datastores, which are commonly referred to as storage pods.

The cloud management computer 106 operates to monitor and manage the clusters C-1, C-2 . . . C-N to provide a cloud environment using the host computers H-1, H-2 . . . H-M in the clusters. The cloud management computer 106 allows users or customers to create and use cloud-based virtual data centers (VDCs) with specified resource requirements. One VDC may include clients running on different host computers H-1, H-2 . . . H-N that are part of different clusters C-1, C-2 . . . C-N. Thus, in a single cluster, a group of clients running on the host computers H-1, H-2 . . . H-N of that cluster may belong to one VDC, while the other clients running on the host computers H-1, H-2 . . . H-N of the same cluster may belong to other VDCs. It is also possible that, in a single host computer, one or more clients running on that host computer H-1, H-2 . . . H-N belong to one VDC, while the other clients running on the same host computer H-1, H-2 . . . H-N belong to other VDCs. The cloud management computer 106 performs operations to manage the VDCs supported by the distributed computer system 100. In some embodiments, the cloud management computer 106 may be a physical computer. In other embodiments, the cloud management computer 106 may be implemented as software program running on a physical computer or a VM, which may be part of one of the clusters C-1, C-2 . . . C-N.

The cloud resource management module 108 of the cloud management computer 106 operates to implement the resource allocation technique using capacity distribution for one or more VDCs, as described in more detail below. In some embodiments, the cloud resource management module 108 is implemented as software program running on the supporting physical computer. However, in other embodiments, the cloud resource management module 108 may be implemented using any combination of software and hardware.

Figure 3:
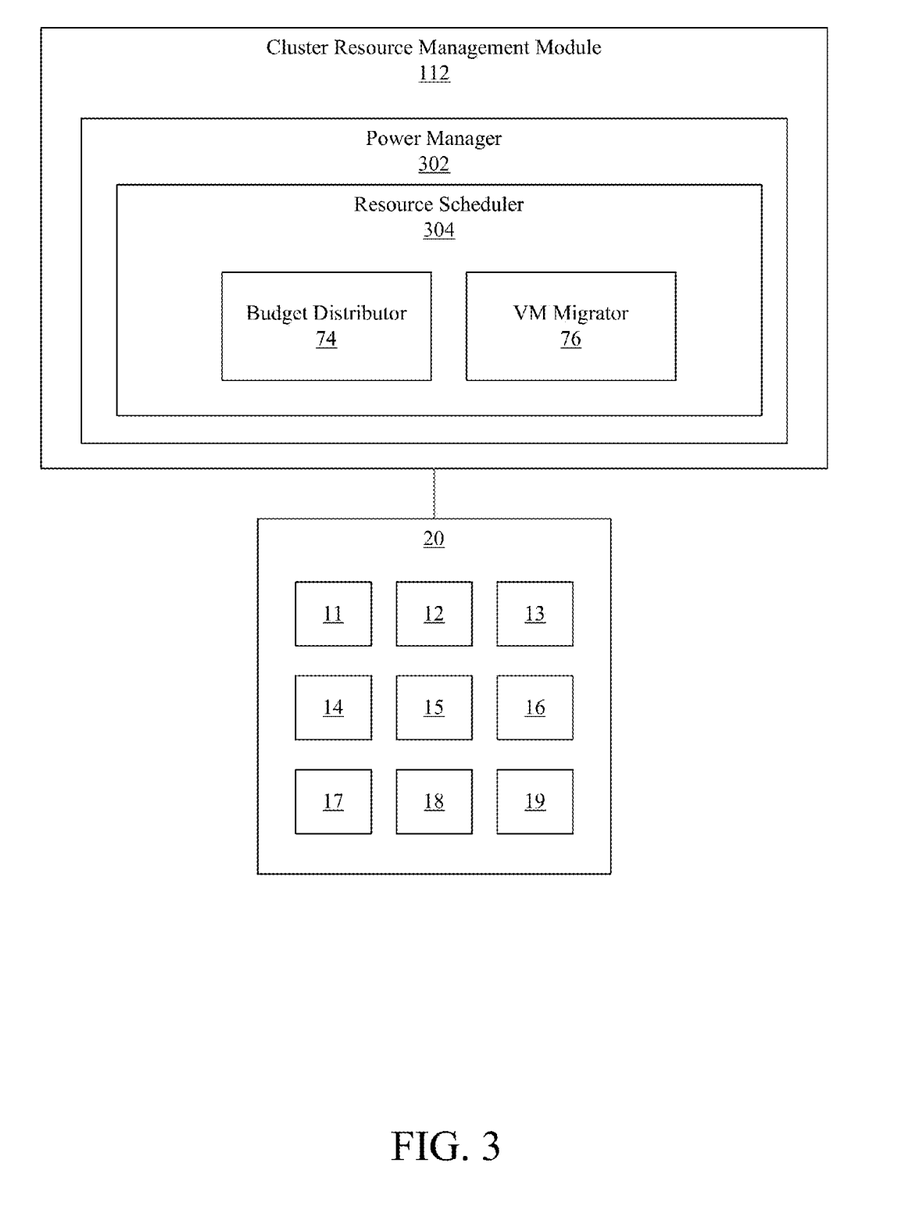
FIG. 3 is a block diagram illustrating one embodiment of the cluster resource management module in accordance with an embodiment of the invention.

FIG. 3 is a block diagram illustrating one embodiment of the cluster resource management module 112 in accordance with an embodiment of the invention. The cluster resource management module 112, in one embodiment, manages the resources of a cluster 20. In an alternative embodiment, the cluster resource management module 112 manages the resources of a rack of host computing machines, depicted in FIG. 3 as boxes 11-19. The cluster resource management module 112 may include a power manager 302 and a resource scheduler 304. The resource scheduler 304 manages allocation of resources to the host computing machines 11-19 (hereinafter "host") running on the server cluster 20. The resource scheduler 304 may also be configured to manage the allocation of resources across multiple racks of host computing machines 11-19, and transfer power budgets from one rack to another rack. An example of a suitable resource scheduler is available as the VMWare Distributed Resource Scheduler from VMWare, Inc. of Palo Alto, Calif., which manages the allocation of resources to a set of virtual machines running on a cluster of host systems, given resource-based service level agreements and system- and user-specified constraints. The power manager 302 operates to power-on and power-off hosts 11-19. An example of a suitable power manager is the VMWare Distributed Power Management module.

The server cluster 20 includes a plurality of hosts 11-19 that are grouped together, either physically or logically. Although only nine hosts are depicted, in practice the server cluster 20 may include an arbitrary number of hosts. Each of the host systems 11-19, as described above with reference to FIG. 2, includes physical hardware and virtualization software for the operation and management of virtual machines. The cluster resource management module 112 also maintains a cluster power limit, which may be received by the cluster resource management module as input. The cluster power limit refers to the maximum allowed power consumption of the cluster 20. The power limit may be user-defined, or in the alternative, defined by the amount of power available to the cluster 20.

The resource scheduler 304 is configured to allocate power budgets among the hosts 11-19 of the cluster 20. As will be described below, the resource scheduler 304 allocates power budgets of the hosts 11-19 to support resource management goals, which includes satisfying constraints and resource entitlements. As a result, the power efficiency of the cluster 20 may be increased. Each host 11-19 of the cluster 20 has an upper and a lower power limit. The upper power limit of the host refers to the amount of power the host uses when operating at maximum processing capacity. The lower power limit of a host refers to the reserve power usage, or in other words, the amount of power that a host uses when operating at a minimum capacity (e.g., when the host is idle).

The resource scheduler 304 may allocate a power budget to a host that is operating at less than the upper power limit of the host. For example, the resource scheduler 304 may be configured to assign to the host 11 a power budget of 300 W even when the host 11 is capable of operating at 400 W. By assigning a lower power budget to the hosts 11-19, the resource scheduler 304 maintains a total power usage that is below the cluster power limit. As power requirements fluctuate, depending upon the number and processing needs of the virtual machines operating on the hosts 11-19, the resource scheduler 304 may re-allocate power budgets to the hosts 11-19. For example, if initially the resource scheduler 304 had assigned a power budget of 300 W to each of the hosts 11-19, but later determined that the host 12 is operating above a target utilization rate, the resource scheduler 304 may assign the host 12 a higher power budget. Utilization refers to a ratio of demand to capacity for a host system, and if the utilization for any host system is over a target utilization, the resource scheduler 304 may re-allocate power budgets to reduce the utilization. In other words, by increasing the power budget, or upper power limit of a host, more processing resources are available to the host, and the utilization is reduced. The resource scheduler 304 utilizes a budget distributor 74 to accomplish this.

The budget distributor 74, in one embodiment, is configured to make a determination of ExcessPowerCapacity, SparePowerCapacity, and UnreservedPowerCapacity. The budget distributor 74 calculates, in one embodiment, the ExcessPowerCapacity by determining a cluster power limit and subtracting from the cluster power limit a sum across all hosts the upper power limit. The ExcessPowerCapacity may be expressed by the equation:

$$\text{ExcessPowerCapacity} = \text{clusterPowerCap} - \text{sumAcrossHosts(hostPowerCap on Host)} \quad (1)$$

The budget distributor 74 calculates the SparePowerCapacity by determining the cluster power limit and subtracting the sum of the current power needed to meet virtual machine demand on a host. The SparePowerCapacity may be expressed by the equation:

$$\text{SparePowerCapacity} = \text{clusterPowerCap} - \text{sumAcrossHosts(power requirement of host)} \quad (2)$$

The budget distributor 74 calculates the UnreservedPowerCapacity by determining the cluster power limit and subtracting the sum of the reserve power needed to meet virtual machine power reservation requirements. Often times, the reserve power needed is defined by a service level agreement ("SLA"). For example, an SLA may state that when a virtual machine is provisioned, the virtual machine is guaranteed to be capable of processing at a certain rate, which depends upon the power available to the host that is executing the virtual machine. The UnreservedPowerCapacity may be expressed by the equation:

$$\text{UnreservedPowerCapacity} = \text{clusterPowerCap} - \text{sumAcrossHosts(VM reserve requirement)} \quad (3)$$

The budget distributor 74 relies on the ExcessPowerCapacity, SparePowerCapacity, and the UnreservedPowerCapacity when making a determination to re-allocate power limits to the hosts. The resource scheduler 304 may be configured to analyze the power usage of the hosts 11-19 according to a predetermined schedule. For example, the resource scheduler 304 may be configured to analyze the cluster 20 every five minutes. At the beginning of every analysis cycle, the budget distributor 74 makes recommendations to reduce any host excess power limit (above peak usage if the host is powered-on, and above 0 if the host is powered off), and makes recommendations to re-allocate ExcessPowerCapacity to the hosts 11-19.

Any recommendation by the budget distributor 74 to increase the upper power limit of a host may involve a subsequent recommendation to decrease the upper power limit of other host(s) to obtain the excess capacity. The resource scheduler 304 ensures that throughout the reallocating process the cluster power limit is never exceeded by the hosts 11-19.

In a further embodiment, the budget distributor 74 is also configured to manage load-balancing. The budget distributor 74 may determine if, subject to a cost/benefit analysis, changing a host upper power limit is better than migrating virtual machines to a new host. The cost/benefit analysis includes analyzing whether powering-on a new host will cause the total cluster power usage to exceed the cluster power limit.

In one embodiment, the resource scheduler 304 also includes a virtual machine migrator 76. The VM migrator 76 is configured to move a virtual machine from one host to another host. For example, if the cluster resource management module 112 determines that the host 15 should be powered down, the VM migrator 76 identifies suitable hosts for receiving the virtual machines of the host 15 before the power manager 302 shuts off the host 15.

In an embodiment, the cluster resource management module 112 converts the power capacity assigned to each host into CPU capacity so that conventional CPU resource management system operating in the cluster management computer 110 works without needing any changes.

Although not illustrated, the cluster resource management module 112 utilizes a mechanism, for enforcing the assigned host power capacity. This enforcing mechanism may be implemented in the cluster management computer 110 as hardware or firmware.

Figure 4:
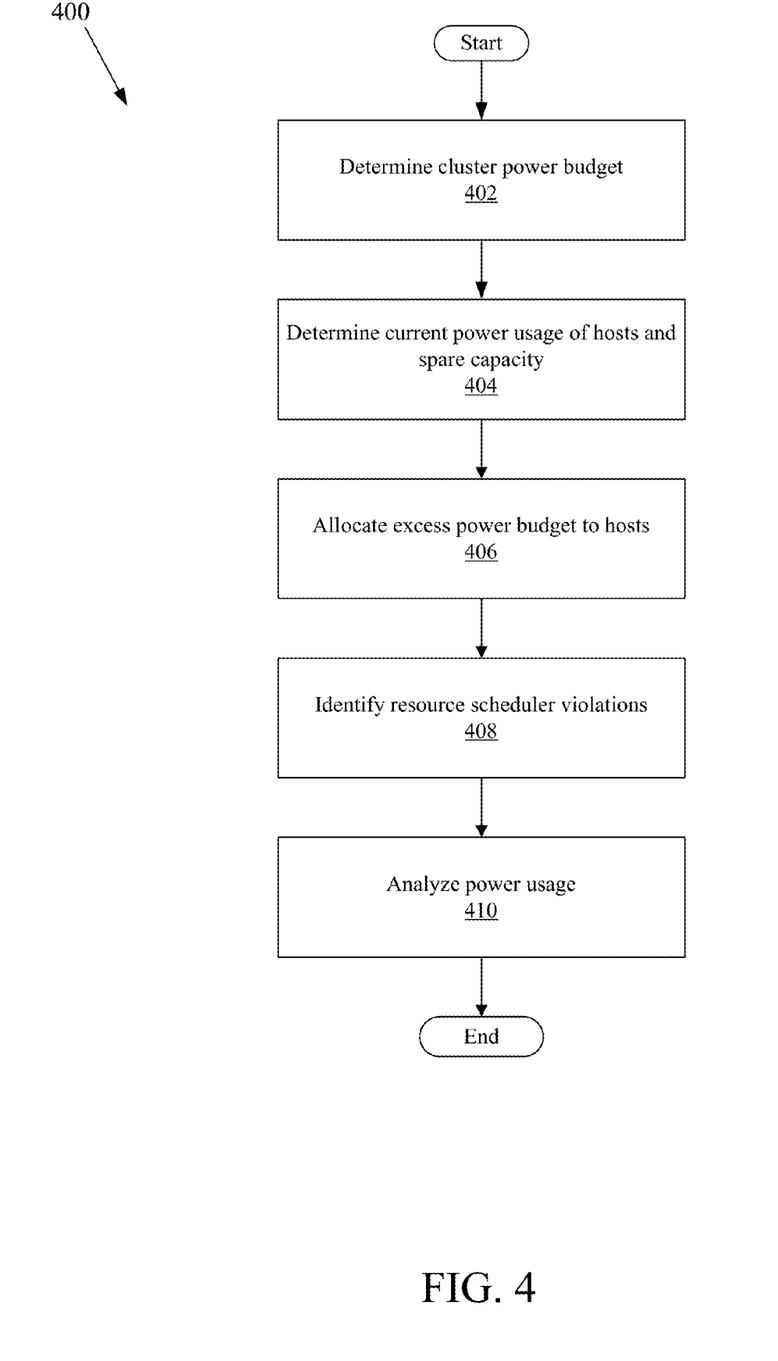
FIG. 4 is a flow chart diagram illustrating one embodiment of a method for analyzing power usage in a cluster, in accordance with embodiments of the present invention.

FIG. 4 is a flow chart diagram illustrating one embodiment of a method 400 for analyzing power usage in a cluster, in accordance with embodiments of the present invention. The method starts and, at block 402, a cluster power budget is determined. Determining the cluster power budget comprises, in one example, identifying a cluster power limit for the entire cluster, and upper power limits for each host. The sum of the upper power limits of the hosts is less than or equal to the cluster power limit. The cluster power limit may be a predefined number selected by a cluster administrator based on desired target power usage. Alternatively, the cluster power limit may be determined according to power available to the cluster.

At block 404, a current, or real-time, power usage of each host is measured and a spare capacity is calculated. In one embodiment, calculating the spare capacity comprises calculating the SparePowerCapacity as described above with reference to FIG. 3. At block 406, excess power is allocated to the hosts of the cluster based on the spare power capacity. In one example, the excess power is evenly distributed to powered-on hosts. In another example, the excess power is distributed to hosts based on utilization. Utilization refers to the ratio of demand to capacity for the host system. Hosts with a utilization above a target utilization may receive a greater portion of the spare power capacity (higher upper power limit). Stated differently, hosts with a utilization that is greater than a target utilization may receive a greater increase in power budget. For example, if the upper power limit assigned to each host is 300 W, and one host out of five hosts in a server rack has a utilization above a target utilization, the one host may receive a power budget increase to 350 W while the remaining hosts are increased to 310 W.

At block 408, resource scheduler violations are identified. In one embodiment, resource scheduler violations include hosts or virtual machines that are violating, for example, service level agreements. An example of a service level agreement might include an agreement to provide a certain amount of processing capability to a virtual machine. If a host, because of an upper power limit assigned to the host, is violating the service level agreement, an increase in the upper power limit may be triggered and performed according to the description above with reference to block 406. At block 410, power usage is analyzed and determinations are made to power-on, power-off, or redistribute power budgets are made, as will be described below with reference to FIGS. 5 and 6.

Figure 5:
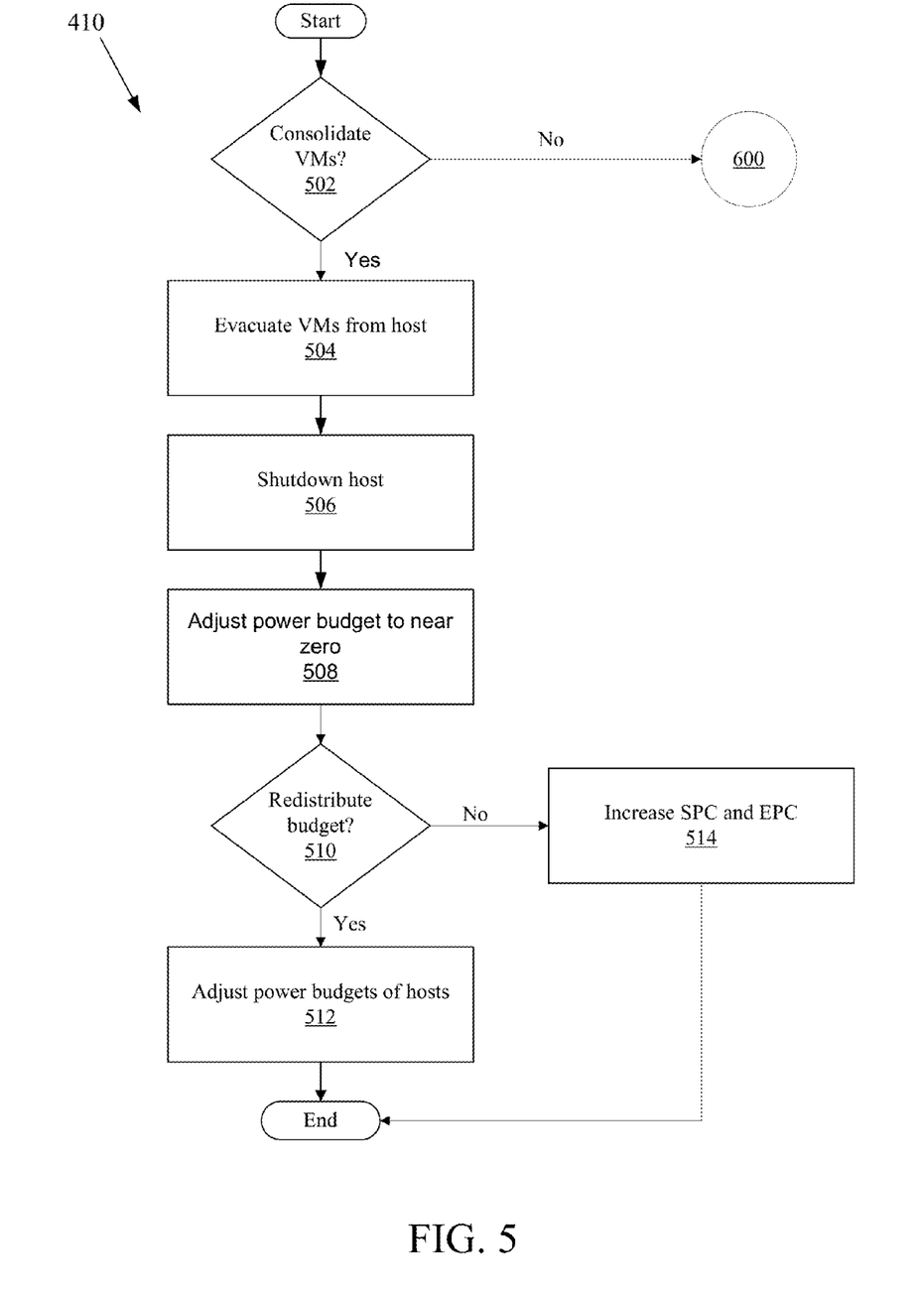
FIG. 5 is a flow chart diagram illustrating one embodiment of a method for analyzing the power usage of a cluster, in accordance with embodiments of the invention.

FIG. 5 is a flow diagram illustrating one embodiment of a method 410 for analyzing the power usage of a cluster, in accordance with embodiments of the invention. The method 410, in one embodiment, is a continuation of the method 400 of FIG. 4. At block 502, a determination is made whether to consolidate virtual machines from multiple hosts onto one host. The determination is based on, in part, the utilization of each host. The utilization, as described above, is a ratio of demand to capacity for the host. If multiple hosts are operating below a target utilization, the hosts may be candidates for consolidation. In other words, if multiple hosts are operating below capacity, the virtual machines from one of the hosts may be migrated or consolidated to another host so that the one host may be powered-off. If the determination is made to not power-off a host, the method continues at connector block 600, which references method 600 of FIG. 6, described below.

If, however, the decision is made to select and power-off a host, the virtual machines are evacuated, at block 504, from the selected host. Evacuating virtual machines, in one embodiment, comprises identifying at least one target destination based on resource utilization, and moving the virtual machines to the target destination(s). At block 506 the selected host is powered-off.

At block 508, the power budget, or upper power limit, of the selected host is changed to have a nominal value of near zero to allow the selected host to respond to, for example, wake on LAN requests. At decision block 510, the decision is made whether to redistribute the power budget of the powered-off host. If the decision is yes, at block 512, the power budgets, or upper power limits, of the remaining hosts are increased proportionally. For example, if the power budget of the powered-off host was 300 W, and there are six remaining hosts, the power budget of each remaining host may be increased by 50 W. Alternatively, the power budgets of the remaining hosts may be increased according to the individual processing needs of the hosts. In other words, one host may have an increase of 70 W, while another is increased 30 W. If, however, the decision is made to not increase the power budgets of the hosts, then the values of the SparePowerCapacity and the ExcessPowerCapacity are increased 514, and the method 410 ends.

Figure 6:
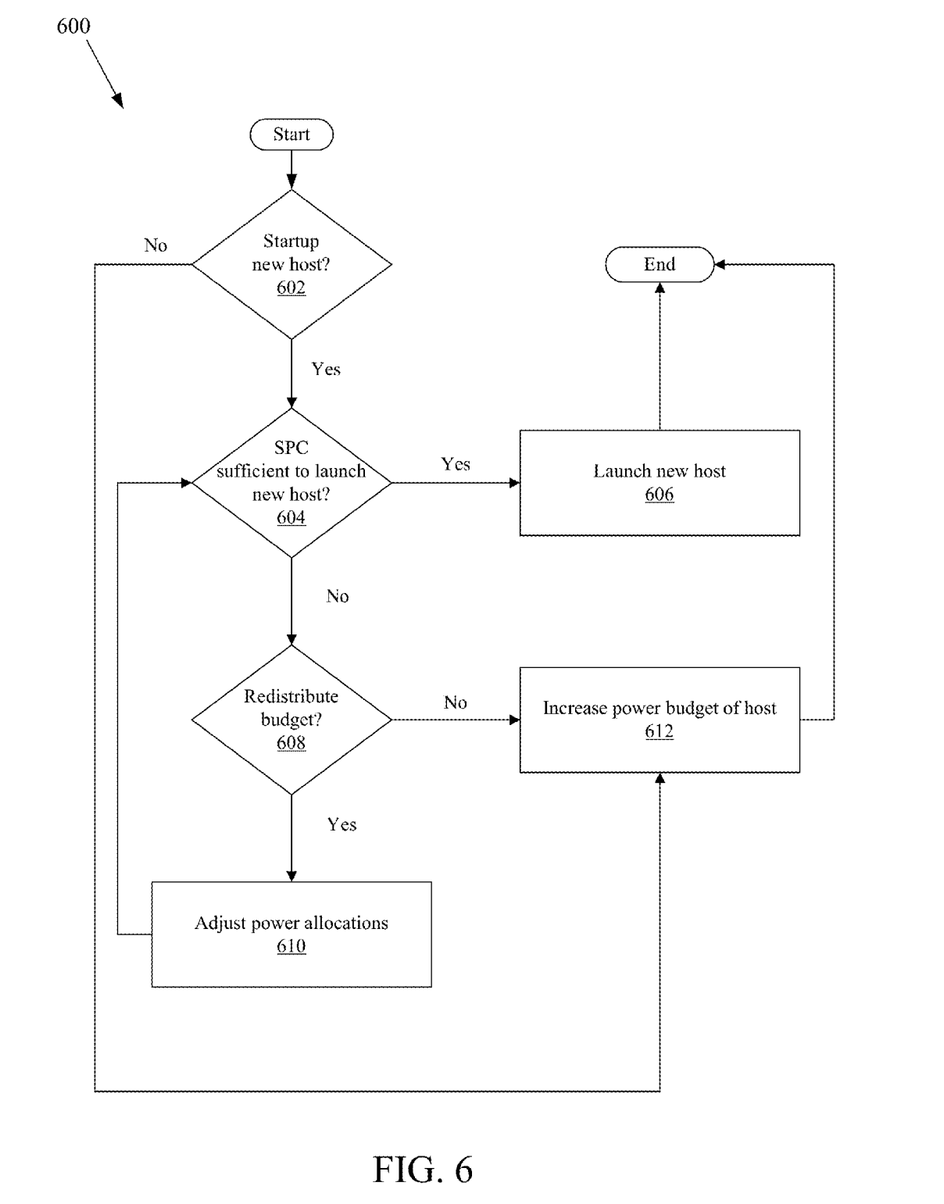
FIG. 6 is a flow chart diagram illustrating one embodiment of a method for determining whether to power-on a new host computer, in accordance with embodiments of the present invention.

FIG. 6 is a flow chart diagram illustrating one embodiment of a method 600 for determining whether to power-on a new host, in accordance with embodiments of the present invention. The method 600 is, in one embodiment, a continuation of the connector block 600 of FIG. 5. The steps described with reference to FIG. 6 may be performed together with those described above with reference to FIG. 5.

As described above, if utilizations of hosts in the cluster are consistently above a target utilization, a decision, at block 602, may be made to power-on a new host. If a new host is powered-on, virtual machines from across the cluster may be migrated to the new host from source hosts, thereby reducing the utilizations of the source hosts. If a decision is made to not power-on a new host, the power budget of a host may be increased, as described below with reference to block 612.

If the decision to power-on a new host is made, at decision block 604 the SparePowerCapacity value is analyzed to determine if there is sufficient power capacity to power-on a new host. The SparePowerCapacity describes the difference between the cluster power limit, and a sum of the current power usage of all of the hosts. If there is sufficient SparePowerCapacity, the new host is launched at block 606.

If not, a decision is made, at block 608, whether to redistribute the power allocation of all of the hosts. At block 610, the power allocations (i.e., upper power limits) are adjusted. For example, in a cluster of 30 hosts, the upper power limit of each host may be adjusted downward by 10 W, thereby creating SparePowerCapacity of 300 W. The SparePowerCapacity is now sufficient to launch a new host, and the host is launched at block 606.

However, if the decision is made to not redistribute power budgets, then, in one embodiment, the power budget of one host is increased at block 612. For example, it may be determined that the hosts in the cluster are operating at near target utilization, and to reduce the power allocation of each host sufficient to allow a new host to launch would cause the hosts to exceed their corresponding upper power limit (or power budget). However, the power budgets of the hosts may be reduced by a smaller amount to enable one of the hosts to have an increase in power budget. For example, instead of like the previous example where 30 hosts were reduced by 10 W to create 300 W of capacity, the upper power limits of the hosts may be reduced by 1-2 W, thereby creating 30-60 W of SparePowerCapacity. This 30-60 W may be allocated to one host, thereby lowering that host's utilization. Virtual machines may now be migrated to that one host from across the cluster, which consequently, reduces the utilization of the other hosts. The method 600 then ends.

Figure 7:
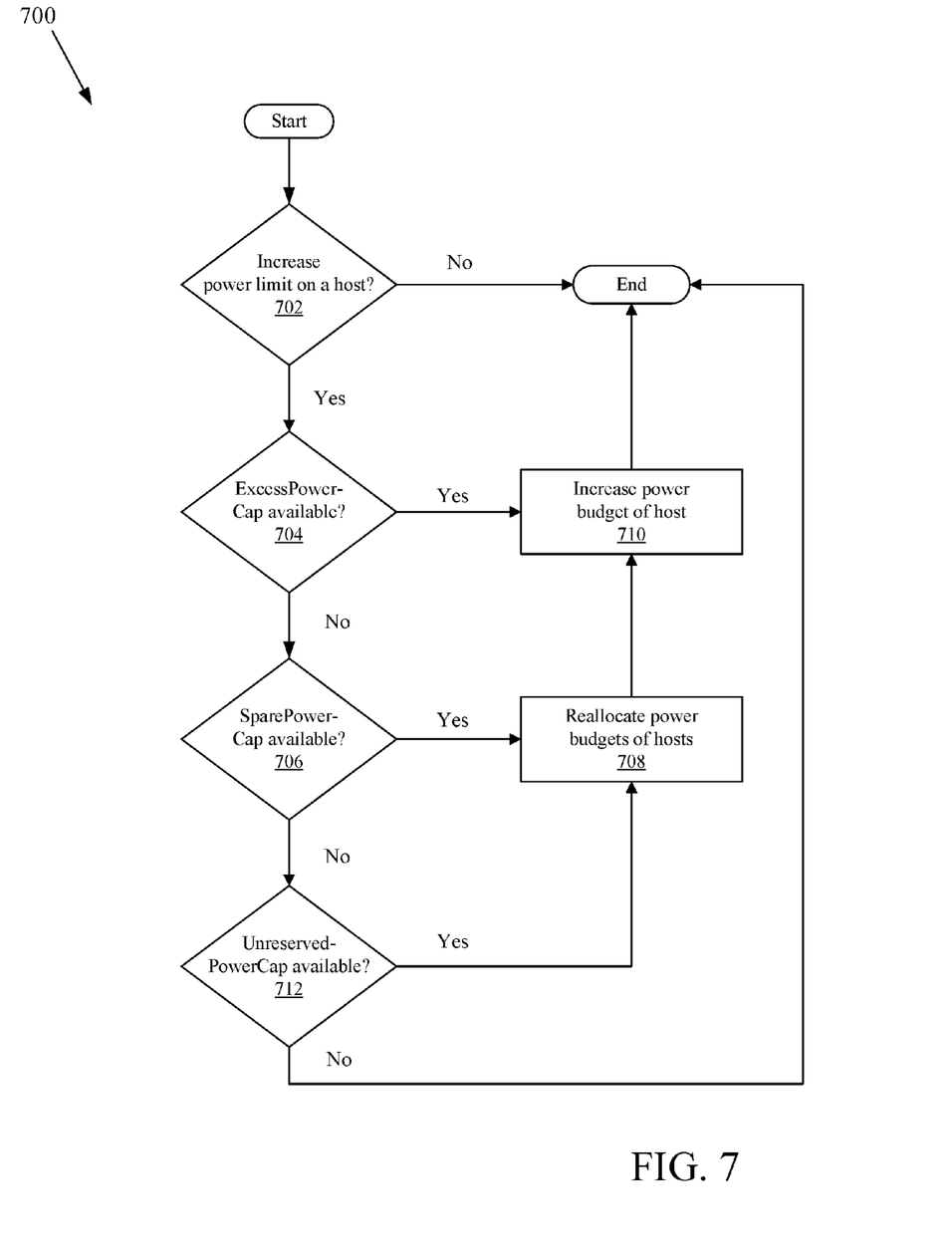
FIG. 7 is a flow chart diagram illustrating one embodiment of a method for processing power allocation recommendations, in accordance with embodiments of the present invention.

FIG. 7 is a flow chart diagram illustrating one embodiment of a method 700 for processing power allocation recommendations, in accordance with embodiments of the present invention. The method starts and a determination is made, at decision block 702, to increase the power limit (or power budget) of a host. The decision to increase the power limit of a host is described above with reference to FIG. 6.

If the decision to increase the power limit of the host is in the affirmative, a determination is made, at decision block 704, if the value of ExcessPowerCapacity indicates that there is sufficient excess power to increase the power limit of the host without modifying the power budget or limit of any other host. If yes, then the power limit is increased 710.

If not, a determination is made, at decision block 706, whether the value of SparePowerCapacity indicates that there is sufficient spare power available. If yes, power budgets are reallocated, at block 708, across the cluster of hosts as described above with reference to FIG. 6. In one example, the power budget of one host is increased, at block 710, while the power budgets of the remaining hosts in the cluster are reduced a corresponding amount. For example, if there are 30 hosts, the power budgets of the 30 hosts are reduced by 2 W each resulting in a 60 W gain which may then be allocated to the desired host.

If not, a determination is made, at decision block 712, whether the value of UnreservedPowerCapacity indicates that there is sufficient unreserved power available. The aim of the reallocation, at block 708, is to leave uniform power headroom across hosts whose power caps are being reduced to support fairness around the ability to support a temporary increase ("burst") in processing. Then the method 700 ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
receiving a power limit of a cluster, wherein the cluster comprises a plurality of host computing machines;
calculating a total power usage of the plurality of host computing machines;
determining a spare power capacity based on a power budget of the cluster and the total power usage of the plurality of host computing machines; and allocating a portion of the spare power capacity to at least one of the plurality of host computing machines based at least partly on the spare power capacity.

2. The method of claim 1, further comprising calculating an excess power capacity based on the power limit of the cluster and a sum of an upper power limit of each of the plurality of host computing machines.

3. The method of claim 1, further comprising calculating an unreserved power capacity based on the power limit of the cluster and a sum of a lower power limit of each of the plurality of host computing machines.

4. The method of claim 3, wherein the lower power limit is equal to a reservation value.

5. The method of claim 1, further comprising analyzing power usage and host utilization of each of the plurality of host computing machines.

6. The method of claim 5, further comprising determining whether to power-off a first host computing machine of the plurality of host computing machines when the utilization is below a target utilization, and before powering-off the first host computing machine, migrating Virtual Machines (VMs) from the first host computing machine to a second host computing machine of the plurality of host computing machines.

7. The method of claim 6, further comprising allocating a power budget of the first host computing machine to at least one of the plurality of host computing machines, and setting a host power limit for the first host computing machine to zero.

8. The method of claim 5, further comprising determining whether to power-on a new host computing machine based upon whether each of the plurality of host computing machines is operating at an upper power limit, and whether powering-on the new host computing machine would cause the total power usage of the plurality of host computing machines to exceed the power limit of the cluster.

9. The method of claim 8, further comprising increasing the host power limit of at least one of the plurality of host computing machines instead of powering-on the new host computing machine if powering-on the new host computing machine would cause the total power usage of the plurality of host computing machines to exceed the power limit of the cluster.

10. A non-transitory computer-readable storage medium containing program instructions for allocating a resource among clients running on host computers using capacity distribution, wherein execution of the program instructions by one or more processors causes the one or more processors to perform steps comprising:
  receiving a power limit of a cluster, wherein the cluster comprises a plurality of host computing machines;
  calculating a total power usage of the plurality of host computing machines;
  determining a spare power capacity based on a power budget of the cluster and the total power usage of the plurality of host computing machines; and
  allocating a portion of the spare power capacity to at least one of the plurality of host computing machines based at least partly on the spare power capacity.

11. The computer-readable storage medium of claim 10, wherein the steps further comprise calculating an excess power capacity based on the power limit of the cluster and a sum of an upper power limit of each of the plurality of host computing machines.

12. The computer-readable storage medium of claim 10, wherein the steps further comprise calculating an unreserved power capacity based on the power limit of the cluster and a sum of a lower power limit of each of the plurality of host computing machines.

13. The computer-readable storage medium of claim 12, wherein the lower power limit is equal to a reservation value.

14. The computer-readable storage medium of claim 10, wherein the steps further comprise analyzing power usage and host utilization of each of the plurality of host computing machines.

15. The computer-readable storage medium of claim 14, wherein the steps further comprise determining whether to power-off a first host computing machine of the plurality of host computing machines when the utilization is below a target utilization, and before powering-off the first host computing machine, migrating Virtual Machines (VMs) from the first host computing machine to a second host computing machine of the plurality of host computing machines.

16. The computer-readable storage medium of claim 15, wherein the steps further comprise allocating a power budget of the first host computing machine to at least one of the plurality of host computing machines, and setting a host power limit for the first host computing machine to zero.

17. The computer-readable storage medium of claim 14, wherein the steps further comprise determining whether to power-on a new host computing machine based upon whether each of the plurality of host computing machines is operating at an upper power limit, and whether powering-on the new host computing machine would cause the total power usage of the plurality of host computing machines to exceed the power limit of the cluster.

18. The computer-readable storage medium of claim 17, wherein the steps further comprise increasing the host power limit of at least one of the plurality of host computing machines instead of powering-on the new host computing machine if powering-on the new host computing machine would cause the total power usage of the plurality of host computing machines to exceed the power limit of the cluster.

19. A distributed computer system comprising:
  a plurality of clusters of host computers, each of the host computers including a processor, memory, and a network interface, the host computer being configured to support a plurality of clients; and
  at least one resource management module operably connected to the clusters of host computers, the at least one resource management module being configured to:
    receive a power limit of a cluster, wherein the cluster comprises a plurality of host computing machines;
    calculate a total power usage of the plurality of host computing machines;
    determine a spare power capacity based on a power budget of the cluster and the total power usage of the plurality of host computing machines; and
    allocate a portion of the spare power capacity to at least one of the plurality of host computing machines based at least partly on the spare power capacity.

20. The distributed computer system of claim 19, wherein the resource management module is further configured to calculate an excess power capacity based on the power limit of the cluster and a sum of an upper power limit of each of the plurality of host computing machines.

21. The distributed computer system of claim 19, wherein the resource management module is further configured to calculate an unreserved power capacity based on the power limit of the cluster and a sum of a lower power limit of each of the plurality of host computing machines.

22. The distributed computer system of claim 21, wherein the lower power limit is equal to a reservation value.

23. The distributed computer system of claim 19, wherein the resource management module is further configured to analyze power usage and host utilization of each of the plurality of host computing machines.

24. The distributed computer system of claim 23, wherein the resource management module is further configured to determine whether to power-off a first host computing machine of the plurality of host computing machines when the utilization is below a target utilization, and before powering-off the first host computing machine, migrate Virtual Machines (VMs) from the first host computing machine to a second host computing machine of the plurality of host computing machines.

25. The distributed computer system of claim 24, wherein the resource management module is further configured to allocate a power budget of the first host computing machine to at least one of the plurality of host computing machines, and set a host power limit for the first host computing machine to zero.

26. The distributed computer system of claim 23, wherein the resource management module is further configured to determine whether to power-on a new host computing machine based upon whether each of the plurality of host computing machines is operating at an upper power limit, and whether powering-on the new host computing machine would cause the total power usage of the plurality of host computing machines to exceed the power limit of the cluster.

27. The distributed computer system of claim 26, wherein the resource management module is further configured to increase the host power limit of at least one of the plurality of host computing machines instead of powering-on the new host computing machine if powering-on the new host computing machine would cause the total power usage of the plurality of host computing machines to exceed the power limit of the cluster.

* * * * *